March 5, 1957  R. A. WRIGLEY  2,783,810
NUT WITH WEDGING LOCK WASHER AND RESILIENT
BACKING WASHER ASSEMBLY
Filed Jan. 3, 1955
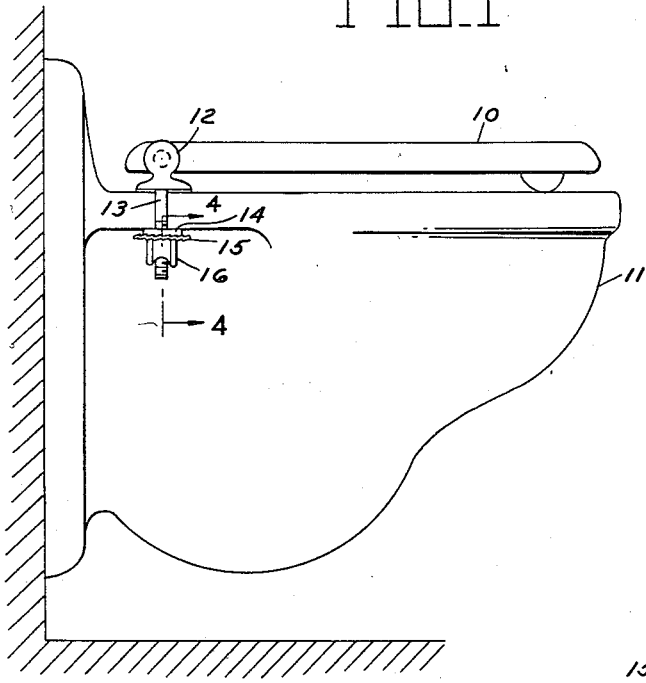
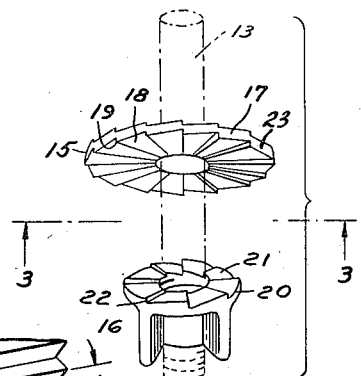
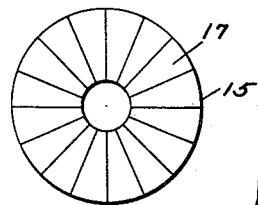
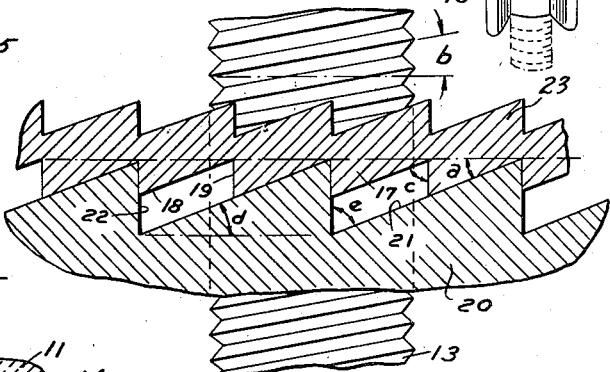
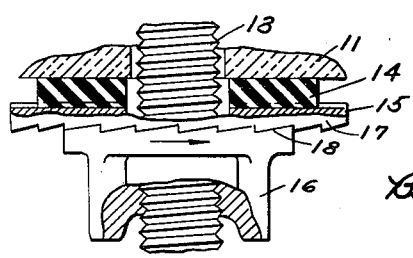
INVENTOR.
ROBERT A. WRIGLEY
BY
*Barney, Kieulle, Laughlin & Raisch*
ATTORNEYS United States Patent Office 2,783,810
Patented Mar. 5, 1957

2,783,810

NUT WITH WEDGING LOCK WASHER AND RESILIENT BACKING WASHER ASSEMBLY

Robert A. Wrigley, Grosse Pointe, Mich.

Application January 3, 1955, Serial No. 479,541

4 Claims. (Cl. 151—34)

This invention relates to a lock washer and nut assembly for use particularly with frangible members wherein a nut is threaded on a bolt passing through the frangible member and the nut and is prevented from being inadvertently loosened or backed off.

In the use of a nut and bolt through an opening in a frangible member, such as an article made of glass or porcelain, a rubber washer has been customarily used to prevent breaking or marring of the surface of the article. Because of the resilience of the rubber there is a great tendency for the nut to become loosened from the bolt especially under vibrating conditions. To counteract this it has been customary to apply excessive torque to the nut in order to cause it to grip more tightly. Such excessive torque will result in either breaking of the frangible article or distortion of the rubber washer. For example, where the rubber washer is made of soft rubber, it will be crushed and if it is made of hard rubber it will be twisted. In any event, the nut will, in due course, become loosened from the bolt.

It is an object of this invention to provide a novel lock washer and nut assembly adapted to be used in combination with a resilient washer on a bolt passing through a frangible object.

Basically, the assembly includes a flat washer having a multiplicity of uniformly spaced and radially extending serrations on the surfaces thereof and a nut having the surface thereof adjacent the washer formed with corresponding uniformly spaced and radially extending serrations. The serrations on the adjacent faces of the nut and washer cooperate when the nut is screwed on the bolt to lock the nut in position on the bolt, as presently described.

Referring to the accompanying drawings:

Fig. 1 is an elevational view of a frangible object on which the washer and nut assembly may be used.

Fig. 2 is a perspective view of the washer and nut.

Fig. 3 is a plan view of the washer at the line 3—3 on Fig. 2.

Fig. 4 is a sectional view at the line 4—4 on Fig. 1.

Fig. 5 is a fragmentary sectional view similar to Fig. 4 on a greatly enlarged scale.

Referring to Fig. 1, the washer and nut assembly is shown as applied for mounting a seat 10 on a toilet bowl 11. The seat 10 is pivotally mounted to a bracket 12 having a threaded bolt member 13 extending through holes or openings in the bowl 11.

As shown in Fig. 4, a flat annular washer 14 of resilient, distortable material, such as rubber, is positioned with one surface thereof adjacent the hole of the frangible bowl 11. An annular lock washer 15 of rigid material, such as metal, and embodying the structure of the invention, is positioned adjacent the washer 14 and a lock nut 16 also embodying the structure of the invention is threaded onto the bolt 13.

Referring to Figs. 2 and 3, the lock washer 15 is formed with a multiplicity of uniformly spaced and radially extending serrations 17 on the opposite faces thereof. Each of the serrations is provided with an inclined surface 18, inclined in the direction of the threads on the bolt and nut, and a second surface 19 at a substantially greater angle, preferably 90°. Specifically, as shown in Fig. 5, the inclined surface 18 forms an angle $a$ with the plane of the washer greater than the lead angle $b$ of the bolt, while the surface 19 forms an angle $c$ with the plane of the washer 15.

The surface of the nut 16, which contacts the washer 15, is provided similarly with a multiplicity of uniformly spaced and radially extending serrations 20 having surfaces 21 inclined in the direction of the threads of the bolt and surfaces 22 forming a greater angle, preferably 90°. Specifically, the surfaces 21 form an angle $d$ with the plane of the surface of the nut greater than the lead angle $b$ of the bolt and equal to the angle $a$ formed by the surfaces 17 of the lock washer while the surfaces 22 form an even greater angle $e$, preferably 90°, with the plane. The spacing of the serrations 20 on the nut 16 is greater than the spacing of the serrations 17 on the washer 15. Each serration of the nut may span two or more serrations of the washer. The serrations on the nut are thus angularly spaced in the plane of the washer to form included angles which are whole multiples of the included angle formed by successive serrations on the washer.

In order to facilitate assembly of the washer and nut, the opposite surface of the washer is similarly formed with serrations 23 which are identically spaced and inclined as are the serrations 17. In this manner, the washer can be used without mental thought as to whether or not it is being properly placed on the bolt.

In use, the resilient washer 14 is first placed over the bolt 13 adjacent to the body of the frangible bowl 11, the lock washer 15 is positioned adjacent the resilient washer 14 and the nut 16 is threaded on the bolt. As the nut 16 is rotated, the serrations 20 on the nut engage the serrations 17 on the washer and the washer is rotated together with the nut until the serrations 23 on the other surface of the lock washer engage and grip the resilient washer 14. Continued rotation of the nut causes a greater axial movement of the lock washer than axial movement of the nut because the surfaces 17 and 21 have a greater inclination than the lead angle of the threads.

In this manner, the nut is securely locked and prevented from inadvertent loosening. The serrations 19 adjacent the resilient washer compress and dig into the adjacent face of the washer 14 and thereby prevent movement between the lock washer 15 and the resilient washer 14. The washer 14 is compressed against the adjacent face of the toilet bowl and the friction produced thereby resists turning of washer 14.

Vibration will not tend to loosen the nut 16 because as the nut tends to back off the threads of the bolt, the interengagement of the faces 21 of the nut with the faces 18 of the serrations on the washer tend to displace the nut axially a greater distance than the axial movement of the nut due to rotation about the threads of the bolt. Thus, as the nut is attempted to be backed off, the frictional engagement between the nut and the washer 15 and between the washer 15 and the washer 14 and between the washer 14 and the adjacent face of the bowl is actually increased. In order to loosen the nut when it is in a fairly tightened condition, it is actually necessary to rotate washer 15 in a direction for backing the nut off the threads of the bolt.

It can thus be seen that the invention provides a lock washer and nut assembly which is admirably suited for use with objects made of frangible material. A very secure locking action can be obtained without the application of severe clamping pressures. The use of the compressible washer 14 in this connection is very important. In the first place, it provides a cushioning effect between the washer 15 and the adjacent face of the bowl to which the bolt extends. It also provides the necessary friction between the washer 14 and the adjacent face of the bowl to resist turning of the washer 15. In addition, the compressible washer actually serves to increase the clamping action of the nut when the nut is turned in a direction to unthread it from the bolt. It will be appreciated that the invention is also applicable in other cases where a rubber or other compressible washer is used in conjunction with a threaded bolt. It will also be appreciated that washer 14 may be formed of other materials than rubber. Washer 14 should be formed of a material that is compressible or distortable and possesses an appreciable amount of resilience. Such material may be broadly designated herein as plastic material.

I claim:

1. Means for securingly mounting a toilet seat on the flanged upper end of a toilet bowl formed of a relatively frangible material comprising a threaded bolt on which the toilet seat is pivotally supported, said bolt extending through the flanged end of the bowl, an apertured washer surrounding said bolt and being positioned flat against the adjacent face of the toilet bowl, said washer being formed of a compressible and resilient material, an apertured lock washer surrounding said bolt and having one face thereof positioned against the adjacent face of the first washer, said lock washer being formed of a rigid material, said lock washer being formed with uniformly spaced and radially extending serrations on the face thereof positioned against the first washer, each of said serrations including an inclined surface forming an angle with the plane of the washer greater than the lead angle of the thread on the bolt member and inclined in the same direction as the thread of the bolt member, said serrations each including a second surface inclined generally in an axial direction and forming an abutment, said lock washer being formed with uniformly spaced and radially extending serrations on the other face thereof, each of said serrations including an inclined surface forming an angle with the plane of the washer greater than the lead angle of the thread on the bolt member and inclined in the same direction as the thread of the bolt member, said serrations each including a second surface inclined generally in an axial direction and forming an abutment, and a nut threaded on said bolt and having its undersurface engaging the other face of said lock washer, said nut being formed with uniformly spaced and radially extending serrations on the undersurface thereof, each of said serrations including an inclined surface in substantially coplanar engagement with the inclined surface of the serrations on the adjacent face of the lock washer, and an abutment engaging the abutment on the adjacent face of the lock washer, said abutments engaging to cause rotation of said lock washer when the nut is turned in a direction to thread it on the bolt and said inclined surfaces engaging one another to further compress said resilient washer when the nut is turned in the direction to back off the threads of said bolt.

2. The combination set forth in claim 1 wherein the high points of said serrations on one face of the lock washer are axially aligned with the high portions of the serrations on the other face of the lock washer.

3. The combination set forth in claim 2 wherein the serrations on one face of the lock washer are identical to the serrations on the other face of the lock washer.

4. The combination set forth in claim 1 wherein said first mentioned washer is formed of rubber.

References Cited in the file of this patent

UNITED STATES PATENTS

| 525,837 | Brown | Sept. 11, 1894 |
| 743,822 | Bryar | Nov. 10, 1903 |
| 860,162 | Townsend | July 16, 1907 |
| 860,540 | Hamman et al. | July 16, 1907 |

FOREIGN PATENTS

| 7,116 | Great Britain | May 27, 1886 |
| 514,923 | Great Britain | Nov. 21, 1938 |
| 534,439 | Great Britain | Mar. 6, 1941 |